(12) United States Patent
Mori et al.

(10) Patent No.: US 11,843,273 B2
(45) Date of Patent: Dec. 12, 2023

(54) BATTERY MODULE AND POWER SUPPLY SYSTEM

(71) Applicant: Murata Manufacturing Co., Ltd., Nagaokakyo (JP)

(72) Inventors: Michiya Mori, Nagaokakyo (JP); Kouta Furuhashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 133 days.

(21) Appl. No.: 17/714,186

(22) Filed: Apr. 6, 2022

(65) Prior Publication Data

US 2022/0231530 A1 Jul. 21, 2022

Related U.S. Application Data

(63) Continuation of application No. PCT/JP2020/028307, filed on Jul. 21, 2020.

(30) Foreign Application Priority Data

Oct. 15, 2019 (JP) .................................. 2019-188509

(51) Int. Cl.
*H02J 7/00* (2006.01)
*H01M 10/48* (2006.01)
(Continued)

(52) U.S. Cl.
CPC ....... *H02J 7/007182* (2020.01); *H01M 10/48* (2013.01); *H02J 7/0047* (2013.01);
(Continued)

(58) Field of Classification Search
CPC ................................................. H02J 7/007182
(Continued)

(56) References Cited

U.S. PATENT DOCUMENTS

2002/0186576 A1 12/2002 Kanouda et al.
2007/0047100 A1 3/2007 Takahashi et al.
(Continued)

FOREIGN PATENT DOCUMENTS

| JP | 2002-369407 A | 12/2002 |
| JP | 2007-068338 A | 3/2007 |
| WO | 2017/209238 A1 | 12/2017 |

OTHER PUBLICATIONS

Official Communication issued in International Patent Application No. PCT/JP2020/028307, dated Sep. 24, 2020.

*Primary Examiner* — Joseph Chang
(74) *Attorney, Agent, or Firm* — Keating & Bennett, LLP

(57) ABSTRACT

A battery module includes a battery, a bidirectional DC-DC converter, and a controller. The bidirectional DC-DC converter may convert a direct-current voltage output from the battery and thereafter output the direct-current voltage to a load. The controller is configured or programmed to perform constant voltage control of the bidirectional DC-DC converter and receive a stop warning signal providing advance notice that output of a power supply is to stop. The controller is configured or programmed to, before receiving the stop warning signal, perform control such that an output voltage of the bidirectional DC-DC converter is lower than a first target voltage, and, after receiving the stop warning signal and before the output of the power supply stops, increase the output voltage of the bidirectional DC-DC converter to the first target voltage or higher.

20 Claims, 15 Drawing Sheets

(51) Int. Cl.
   *H02J 7/02*    (2016.01)
   *H02J 7/34*    (2006.01)
   *H02J 9/06*    (2006.01)

(52) U.S. Cl.
   CPC ............. *H02J 7/0063* (2013.01); *H02J 7/02* (2013.01); *H02J 7/34* (2013.01); *H02J 9/061* (2013.01); *H02J 2207/20* (2020.01)

(58) Field of Classification Search
   USPC .......................................................... 307/66
   See application file for complete search history.

(56) References Cited

U.S. PATENT DOCUMENTS

2019/0036377 A1* 1/2019 Ou Yang ................ H02J 9/061
2019/0097452 A1   3/2019 Mori \* cited by examiner

FIG. 4

VOLTAGE-VARIATION STORAGE UNIT 344

| DIFFERENCE [A/sec] | TARGET-VOLTAGE VARIATION [V] |
|---|---|
| (dIoutBL-dIoutB)<2 | 0.01 |
| 2≦(dIoutBL-dIoutB)<4 | 0.02 |
| 4≦(dIoutBL-dIoutB)<6 | 0.03 |
| 6≦(dIoutBL-dIoutB)<8 | 0.04 |
| 8≦(dIoutBL-dIoutB) | 0.05 |

FIG. 10

VOLTAGE-VARIATION STORAGE UNIT 2344

| DIFFERENCE [A/sec] | TARGET-VOLTAGE VARIATION [V] |
|---|---|
| $-2 \leqq$ (dIoutPL-dIoutP) | 0.01 |
| $-4 \leqq$ (dIoutPL-dIoutP) $< -2$ | 0.02 |
| $-6 \leqq$ (dIoutPL-dIoutP) $< -4$ | 0.03 |
| $-8 \leqq$ (dIoutPL-dIoutP) $< -6$ | 0.04 |
| (dIoutPL-dIoutP) $< -8$ | 0.05 | ized
BATTERY MODULE AND POWER SUPPLY SYSTEM

CROSS REFERENCE TO RELATED APPLICATIONS

This application claims the benefit of priority to Japanese Patent Application No. 2019-188509 filed on Oct. 15, 2019 and is a Continuation Applications of PCT Application No. PCT/JP2020/028307 filed on Jul. 21, 2020. The entire contents of each application are hereby incorporated herein by reference.

BACKGROUND OF THE INVENTION

1. Field of the Invention

The present invention relates to a battery module and a power supply system.

2. Description of the Related Art

A power supply system including a converter unit and a battery module has been disclosed (for example, refer to International Publication No. 2017/209238). In the power supply system, the converter unit is configured to convert alternating-current power supplied from a commercial power source into direct-current power and output the direct-current power to a load, and the battery module is configured to assist in the supply of direct-current power to the load. The output terminal of the battery module is connected between the output terminal of the converter unit and the load, and the output voltage of the battery module is controlled so as to be maintained at a constant value equal to a predetermined output voltage target value. The output voltage target value is set so as to increase with an increase in the current value of a current that is output from the converter unit when the current value of a current that is output from the converter unit is equal to or higher than a first threshold, which is lower than a predetermined value. Moreover, when the current value of a current that is output from the converter unit is between a second threshold, which is lower than the predetermined value and higher than the first threshold, and the first threshold, the output voltage target value is set so as to be higher than the output voltage of the converter unit. Accordingly, when the load enters a heavy load state and the output voltage of the converter unit decreases, it is possible to stabilize a direct-current voltage applied to the load by smoothly supplying direct-current power to the load from the battery module.

In the power supply system described in International Publication No. 2017/209238, the output voltage of the converter unit rapidly decreases, for example, if a power outage of the commercial power source occurs. In contrast, the battery module performs control such that the direct-current voltage applied to the load is maintained at the target value. In such a case, it is possible that constant voltage control of the battery module does not follow a rapid increase in the output current of the battery module and that the direct-current voltage applied to the load temporarily decreases.

SUMMARY OF THE INVENTION

Preferred embodiments of the present invention provide battery modules and power supply systems that are each able to reduce a variation in voltage applied to a load.

A battery module according to a preferred embodiment of the present invention is to be connected to a power supply configured to output a predetermined target voltage to a load, the battery module includes a battery, a DC-DC converter to convert a direct-current voltage that is output from the battery and thereafter output the direct-current voltage to the load, and a controller configured or programmed to perform constant voltage control of the DC-DC converter and receive a stop warning signal providing advance notice that output of the power supply is to stop, and the controller is configured and programmed to, before receiving the stop warning signal, perform control such that an output voltage of the DC-DC converter is lower than the target voltage and, after receiving the stop warning signal and before the output of the power supply stops, increase the output voltage of the DC-DC converter to the target voltage or higher.

In a battery module according to a preferred embodiment of the present invention, the controller may be configured or programmed to perform control such that a voltage variation in the output voltage of the DC-DC converter at a time when the output voltage of the DC-DC converter reaches the target voltage is smaller than a maximum voltage variation during a period when the output voltage of the DC-DC converter is increased to a voltage close to the target voltage after the stop warning signal is received.

In a battery module according to a preferred embodiment of the present invention, the controller may be configured or programmed to perform control such that the output voltage of the DC-DC converter is maintained at a constant value when a current value of a current flowing from the power supply to the load has become equal to or smaller than a predetermined reference current value.

In a battery module according to a preferred embodiment of the present invention, the controller may be configured or programmed to perform control such that the output voltage of the DC-DC converter is maintained at a constant value when the output voltage of the DC-DC converter has become equal to or higher than the target voltage.

In a battery module according to a preferred embodiment of the present invention, the controller may be configured or programmed to gradually increase the output voltage of the DC-DC converter such that a variation in a current flowing from the DC-DC converter to the load per unit time is smaller than a predetermined upper limit of the variation.

In a battery module according to a preferred embodiment of the present invention, the controller may be configured or programmed to perform control such that the output voltage of the DC-DC converter is maintained at a constant value and thereafter perform control such that the output voltage of the DC-DC converter equals a voltage equal to the target voltage.

In a battery module according to a preferred embodiment of the present invention, a voltage upper limit of the output voltage of the DC-DC converter may be set based on a rated voltage for the load.

A power supply system according to a preferred embodiment of the present invention includes a power supply including an AC-DC converter and a first controller, the AC-DC converter being configured to convert alternating-current power supplied from an alternating-current power source into direct-current power and output the direct-current power to a load, the first controller being configured or programmed to perform constant voltage control of the AC-DC converter such that a voltage that is output from the AC-DC converter to the load equals or substantially equals a predetermined target voltage, the first controller being configured or programmed to, before stopping voltage output to the load, output a stop warning signal providing advance notice that the voltage output to the load is to stop, a battery, a DC-DC converter to convert a direct-current voltage that is output from the battery and thereafter output the direct-current voltage to the load, and a second controller configured or programmed to perform constant voltage control of the DC-DC converter and receive the stop warning signal providing advance notice that output of the power supply is to stop, and the second controller is configured or programmed to, before receiving the stop warning signal, perform control such that an output voltage of the DC-DC converter is lower than the target voltage and, after receiving the stop warning signal and before the output of the power supply stops, increase the output voltage of the DC-DC converter to the target voltage or higher.

A power supply system according to a preferred embodiment of the present invention includes a power supply including a first DC-DC converter and a first controller, the first DC-DC converter being configured to convert direct-current power supplied from a direct-current power source into direct-current power having a different voltage and output the direct-current power having the different voltage to a load, the first controller being configured or programmed to perform constant voltage control of the first DC-DC converter such that a voltage that is output from the first DC-DC converter to the load equals a predetermined target voltage, the first controller being configured or programmed to, before stopping voltage output to the load, output a stop warning signal providing advance notice that the voltage output to the load is to stop, a battery, a second DC-DC converter configured to convert a direct-current voltage that is output from the battery and thereafter output the direct-current voltage to the load, and a second controller configured or programmed to perform constant voltage control of the second DC-DC converter and receive the stop warning signal providing advance notice that output of the power supply is to stop, and the second controller is configured or programmed to, before receiving the stop warning signal, perform control such that an output voltage of the second DC-DC converter is lower than the target voltage and, after receiving the stop warning signal and before the output of the power supply stops, increase the output voltage of the second DC-DC converter to the target voltage or higher.

According to a preferred embodiment of the present invention, a controller is configured or programmed to, before receiving the stop warning signal of the power supply, perform control such that an output voltage of the DC-DC converter is lower than the target voltage. Further, the controller is configured or programmed to, after receiving the stop warning signal of the power supply and before the output of the power supply stops, increase the output voltage of the DC-DC converter to the target voltage or higher. In this way, when the source of power supply to the load switches from the power supply to the battery module, the increasing rate of the current supplied from the battery module to the load can be reduced. Accordingly, a variation in the voltage applied to the load is reduced. The variation in the voltage is caused because the constant voltage control of the battery module does not follow the variation in the output current of the battery module.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is an illustration showing information stored in a voltage-variation storage unit according to the first preferred embodiment of the present invention.

FIG. 10 is an illustration showing information stored in a voltage-variation storage unit according to the second preferred embodiment of the present invention.

DETAILED DESCRIPTION OF THE PREFERRED EMBODIMENTS

Figure 1:
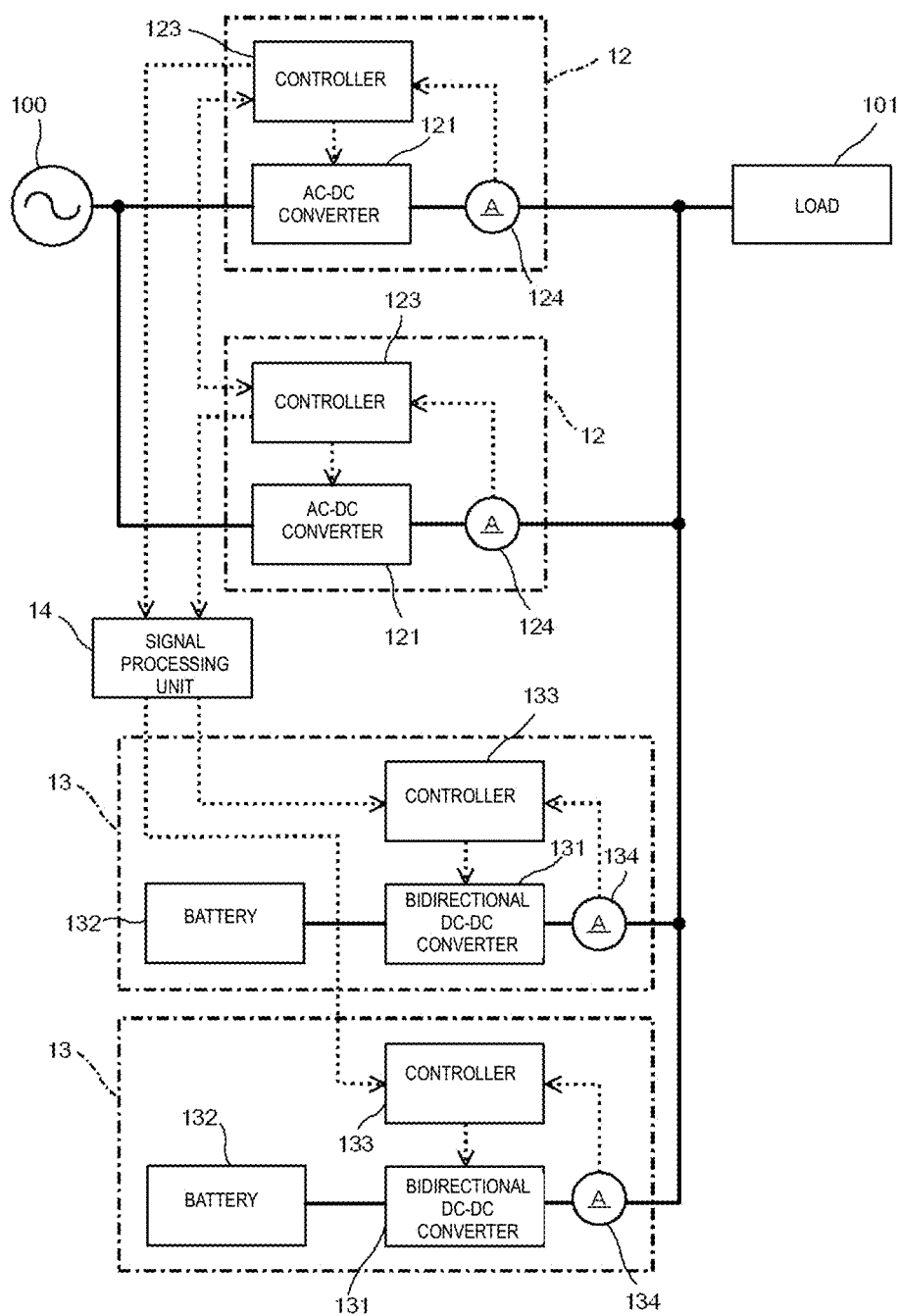
FIG. 1 is an illustration showing a schematic configuration of a power supply system according to a first preferred embodiment of the present invention.

Preferred embodiments of the present invention will be described below with reference to the drawings.

First Preferred Embodiment

A first preferred embodiment of the present invention will be described in detail hereinafter with reference to the drawings. Together with a power supply, a battery module according to the present preferred embodiment is connected to a load, the power supply being configured to perform control such that a voltage that is output to the load equals or substantially equals a predetermined first target voltage and, before stopping voltage output to the load, output a stop warning signal providing advance notice that the voltage output to the load is to stop. The battery module includes a battery, a DC-DC converter to convert a direct-current voltage that is output from the battery and thereafter output the direct-current voltage to the load, and a controller configured or programmed to perform constant voltage control such that the output voltage of the DC-DC converter is maintained at a predetermined second target voltage. The controller is configured or programmed to, before the power supply outputs the stop warning signal, perform control of the output voltage of the DC-DC converter such that the second target voltage is lower than the first target voltage. In addition, the controller is configured or programmed to, after the power supply outputs the stop warning signal, perform control of the output voltage of the DC-DC converter such that the second target voltage is equal to or higher than the first voltage.

The controller is preferably configured or programmed to perform control of the output voltage of the DC-DC converter such that the second target voltage is equal to or higher than the first target voltage before the output of the power supply stops. The stop warning signal is transmitted from the power supply to the controller of the battery module, and either a high-level signal or a low-level signal is transmitted. For example, if a drop in the alternating-current voltage that is input to the power supply is detected, the power supply outputs a high-level signal to the controller of the battery module. If a drop in the alternating-current voltage that is input to the power supply is not detected, the power supply outputs a low-level signal to the controller of the battery module. The stop warning signal is output within an alternating-current-voltage-drop detection period (for example, about 3 msec). Even when the alternating-current voltage that is input to the power supply is low, electric charge stored in a capacitor (for example, an electrolytic capacitor) included in the power supply enables the output voltage to be maintained at the first target voltage for an output retention period (for example, about 10 msec) that reflects the discharging time constant of the capacitor. Accordingly, the controller only has to perform control of the output voltage of the DC-DC converter such that the second target voltage becomes equal to or higher than the first voltage during the period obtained by subtracting the alternating-current-voltage-drop detection period from the output retention period (the obtained period being, for example, about 7 msec). Performing control in this way enables the voltage that is output to the load to be maintained at a constant value.

For example, as shown in FIG. 1, a power supply system according to the present preferred embodiment includes two power supplies 12, two battery modules 13, and a signal processor 14. Each power supply 12 is configured to convert alternating-current power that is output from an alternating-current power source 100 into direct-current power and output the direct-current power to a load 101, and each battery module 13 includes a battery 132. Examples of the load 101 include a blade server. Multiple loads 101 connected in parallel to each other may be connected to the power supplies 12 and the battery modules 13. Further, the two power supplies 12 connected in parallel to each other for redundancy are connected to the alternating-current power source 100. Because of this configuration, even if one of the two power supplies 12 comes to a stop due to a breakdown, the other one of the two power supplies 12 can continue supplying power from the alternating-current power source 100 to the load 101.

Each power supply 12 includes an AC-DC converter 121, a controller 123 configured or programmed to control the AC-DC converter 121, and a current measurer 124 to measure a current value of a current that is output from the AC-DC converter 121. The AC-DC converter 121 is connected between the alternating-current power source 100 and the load 101. The AC-DC converter 121 is configured to convert alternating-current power (such as alternating current having a voltage of, for example, about 200 V) supplied from the alternating-current power source 100 into direct-current power (such as direct current having a voltage of, for example, about 12.3 V) and output the direct-current power to the load 101. The current measurer 124 is configured to output to the controller 123 a measurement signal based on a current value obtained by measuring the output current of the AC-DC converter 121.

The controller 123 corresponds to a first controller configured or programmed to perform constant voltage control of the AC-DC converter 121 such that a voltage that is output from the AC-DC converter 121 to the load 101 equals or substantially equals a predetermined first target voltage. The first target voltage is determined in accordance with the specification of the input voltage for the load 101 and set to, for example, about 12.3 V. Further, the controller 123 includes what a current share function and is configured or programmed to output to the controller 123 of the other power supply 12 a current share signal that reflects the magnitude of the output current of the AC-DC converter 121 to be controlled. The controller 123 is configured or programmed to output the current share signal based on the measurement signal that the controller 123 receives from the current measurer 124. The controller 123 is configured or programmed to control the AC-DC converter 121 so that the output current of the AC-DC converter 121 to be controlled equals or substantially equals the output current of the other AC-DC converter 121, and the control is based on the measurement signal received from the current measurer 124 and a current share signal received from the other controller 123. In this way, the output currents of the two AC-DC converters 121 are maintained approximately at the same or substantially the same level. Further, the controller 123 is configured or programmed to control the AC-DC converter 121 so that the output voltage of the AC-DC converter 121 decreases when the current value of the current that is output from the AC-DC converter 121 exceeds a predetermined current threshold. In addition, the controller 123 is configured or programmed to output the current share signal also to the signal processor 14.

Figure 2:
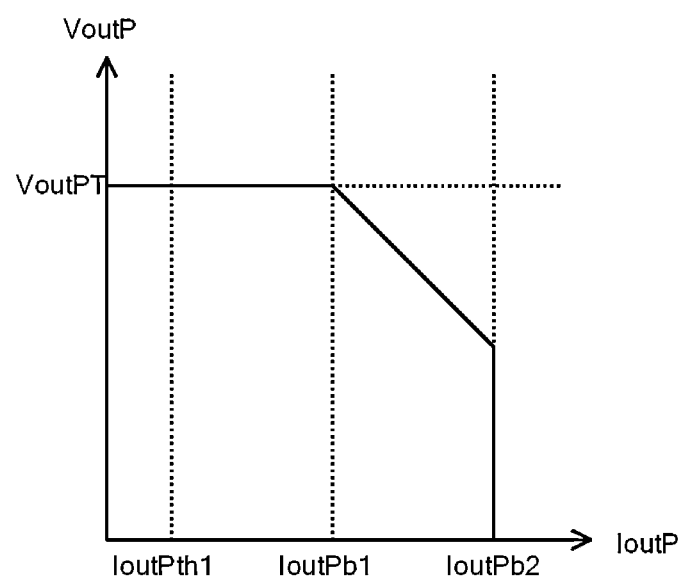
FIG. 2 is an illustration showing output voltage characteristics of an AC-DC converter according to the first preferred embodiment of the present invention.

For example, as shown in FIG. 2, until the current value of the output current of the AC-DC converter 121 becomes equal or substantially equal to a current threshold IoutPb1, the controller 123 performs constant voltage control of maintaining the output voltage of the AC-DC converter 121 at a constant value equal or substantially equal to a predetermined first target voltage VoutPT. Then, when the load 101 enters a heavy load state and the output current of the AC-DC converter 121 exceeds the current threshold IoutPb1, the controller 123 performs control of the AC-DC converter 121 such that the output voltage of the AC-DC converter 121 decreases with an increase in the output current of the AC-DC converter 121. Further, when the output current of the AC-DC converter 121 reaches a predetermined current threshold IoutPb2, the controller 123 performs constant current control of maintaining the output current of the AC-DC converter 121 at a constant value equal to the current threshold IoutPb2.

In addition, the controller 123 is configured or programmed to output a stop warning signal to the signal processor 14. Before the AC-DC converter 121 stops the voltage output to the load 101, the stop warning signal provides advance notice that the AC-DC converter 121 is to stop the voltage output to the load 101. The controller 123 outputs the stop warning signal, for example, when the input voltage to the AC-DC converter 121, which is connected to the alternating-current power source 100 shown in FIG. 1, becomes below a reference value (such as an alternating-current voltage of, for example, about 180 V).

The signal processor 14 is configured or programmed to output the current share signal to a controller 133 of each of the two battery modules 13 upon receiving the current share signal from either one of the controllers 123. In addition, the signal processor 14 is configured or programmed to output the stop warning signal to the controller 133 of each of the two battery modules 13 upon receiving the stop warning signal from either one of the controllers 123.

Each battery module 13 includes a bidirectional DC-DC converter 131, the battery 132, the controller 133 configured or programmed to control the bidirectional DC-DC converter 131, and a current measurer 134 configured to measure a current value of an output current of the bidirectional DC-DC converter 131. The battery 132 is, for example, a lithium-ion battery. The bidirectional DC-DC converter 131 is connected between the battery 132 and the load 101. The bidirectional DC-DC converter 131 includes, for example, a circuit including step-up and step-down functions and configured to operate either in a discharge mode in which the battery 132 is discharged or in a charge mode in which the battery 132 is charged. The bidirectional DC-DC converter 131 converts a direct-current voltage that is output from the battery 132 and thereafter outputs the direct-current voltage to the load 101 when operating in the discharge mode. In contrast, the bidirectional DC-DC converter 131 converts an output voltage of the power supply 12 and thereafter outputs the output voltage to the battery 132 when operating in the charge mode.

The controller 133 includes, for example, an integrated circuit including an MPU and a memory and is configured or programmed to control the output voltage of the bidirectional DC-DC converter 131 by changing a second target voltage. Specifically, the controller 133 is configured or programmed to perform constant voltage control of the bidirectional DC-DC converter 131 such that the output voltage of the bidirectional DC-DC converter 131 is maintained at a predetermined second target voltage. The controller 133 is configured or programmed to change the second target voltage in accordance with the current share signal received from the signal processor 14. Further, before receiving the stop warning signal providing advance notice that the output of the power supply 12 is to stop, the controller 133 performs control of the output voltage of the bidirectional DC-DC converter 131 such that the output voltage of the bidirectional DC-DC converter 131, that is, the second target voltage, is lower than the first target voltage described above. For example, if the first target voltage of the power supply 12 is set to about 12.3 V, the second target voltage is set to about 12.2 V. Further, after receiving the stop warning signal described above, the controller 133 increases the output voltage of the bidirectional DC-DC converter 131, which is the second target voltage, to the first target voltage or higher. Immediately after the power supply 12 outputs the stop warning signal described above, the controller 133 starts to gradually increase the second target voltage, which has been set to a voltage lower than the first target voltage, until the second target voltage reaches a voltage equal or substantially equal to the first target voltage or higher. The term "gradually increase" indicates, for example, slowly increasing the output voltage of the bidirectional DC-DC converter 131 so that the variation in the output current of the bidirectional DC-DC converter 131 per unit time does not exceed a predetermined value. Further, the controller 133 gradually increases the output voltage of the DC-DC converter so that the second target voltage increases to the first voltage or higher during the period obtained by subtracting the alternating-current-voltage-drop detection period (for example, about 3 msec) from the output retention period (for example, about 10 msec), which is, for example, a period of about 7 msec. In this way, when the source of power supply to the load 101 switches from the power supplies 12 to the battery modules 13, the increasing rate of the current supplied from the battery modules 13 to the load 101 can be reduced.

Further, when the current value of the current flowing from the power supply 12 to the load 101, that is, the current value of the output current of the AC-DC converter 121, has become equal to or smaller than a predetermined reference current value, the controller 133 maintains the second target voltage at a constant value. The reference current value can be set to a current value, for example, equal to or smaller than about 50% of the rated current value for the load 101. For example, if the rated current value for the load 101 is about 20 A, the reference current value can be set to about 10 A or about 0 A.

Figure 3:
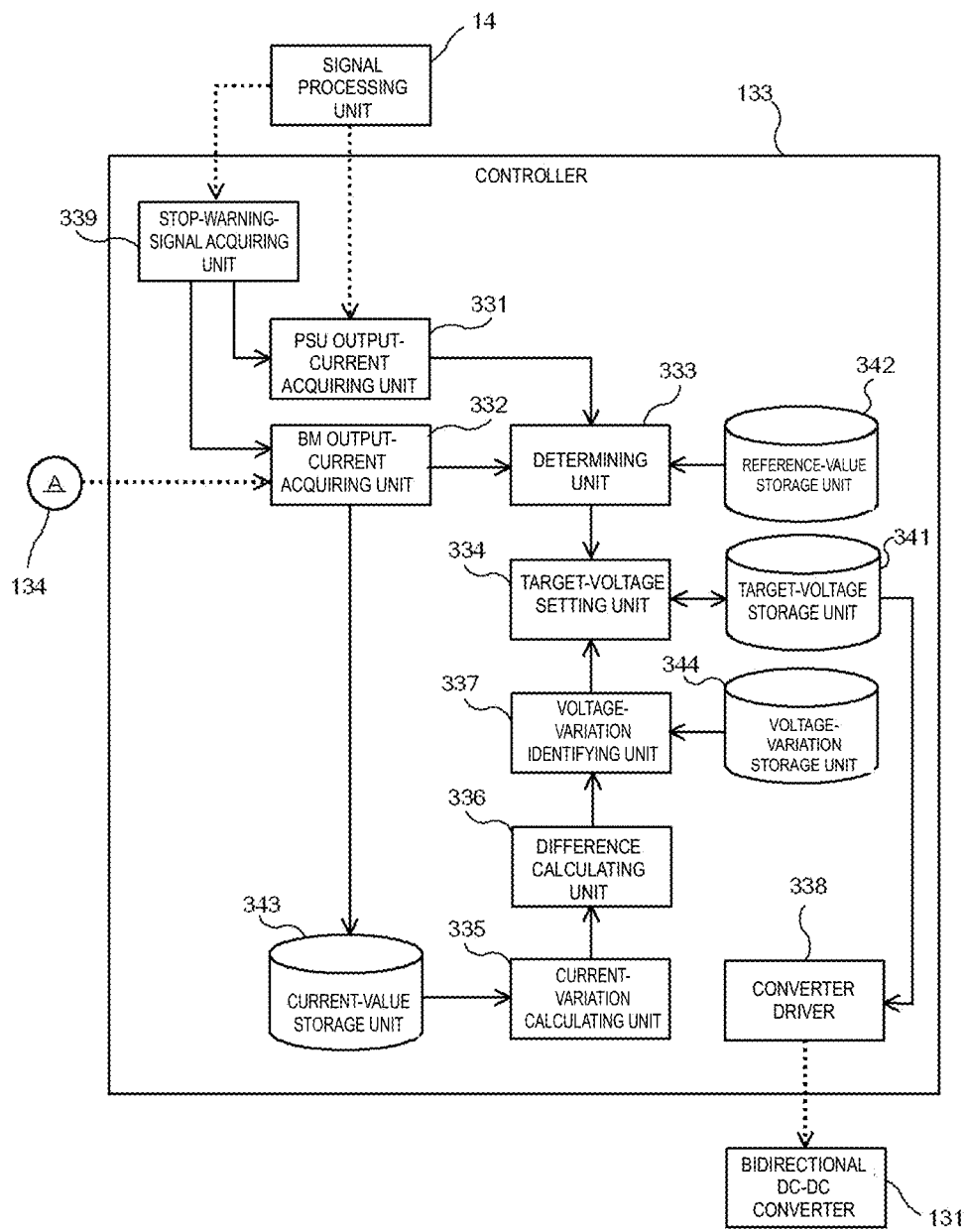
FIG. 3 is a block diagram of a controller according to the first preferred embodiment of the present invention.

As shown in FIG. 3, in the controller 133, for example, the MPU is configured or programmed to execute a program stored in a memory and function as a power-supply-unit (PSU) output-current acquiring unit 331, a battery-module (BM) output-current acquiring unit 332, a determiner 333, a target-voltage setter 334, a voltage-variation identifier 337, a difference calculator 336, a current-variation calculator 335, and a stop-warning-signal acquirer 339. The memory includes a target-voltage storage 341, a reference-value storage 342, a current-value storage 343, and a voltage-variation storage 344. Further, the controller 133 includes a converter driver 338 that is built by using a component such as a digital signal processor (DSP) or a field programmable gate array (FPGA) and that is configured or programmed to drive the bidirectional DC-DC converter 131 by outputting a pulse width modulation (PWM) signal to the bidirectional DC-DC converter 131. The target-voltage storage 341 is configured to store information that indicates a voltage value of the second target voltage that is set by the target-voltage setting unit 334. The converter driver 338 is configured to acquire information that is stored in the target-voltage storage 341 and that indicates a voltage value of the second target voltage. When operating the bidirectional DC-DC converter 131 in the discharge mode, the converter driver 338 generates a PWM signal and outputs the PWM signal to the bidirectional DC-DC converter 131 so that the output voltage of the bidirectional DC-DC converter 131 is maintained at the second target voltage.

The reference-value storage 342 is configured to store information indicating a predetermined current threshold for the output current of the AC-DC converter 121. The current-value storage 343 is configured to store pieces of information that each indicate a current value of the output current of the bidirectional DC-DC converter 131 and that are acquired by the BM output-current acquiring unit 332. The pieces of information indicating current values are stored in chronological order.

For example, as shown in FIG. 4, the voltage-variation storage 344 is configured to store pieces of information each indicating a target-voltage variation, which is a variation in the second target voltage, in association with ranges of a difference (dIoutBL−dIoutB). Here, dIoutB is a variation in the output current of the bidirectional DC-DC converter 131 per unit time, and dIoutBL is the upper limit of dIoutB, which is predetermined. For example, dIoutBL is set to about 10 A/sec.

Referring to FIG. 3, the PSU output-current acquirer 331 is configured to acquire a current value of the output current of the AC-DC converter 121. The output current of the AC-DC converter 121 corresponds to the current share signal, which is received from the signal processor 14. The BM output-current acquirer 332 is configured to acquire a current value of the output current of the bidirectional DC-DC converter 131. The output current of the bidirectional DC-DC converter 131 corresponds to a measurement signal that is received from the current measurer 134. The BM output-current acquirer 332 is configured to save in the current-value storage 343 pieces of information that each indicate a current value of the output current of the bidirectional DC-DC converter 131 and that are acquired by the BM output-current acquirer 332. The pieces of information indicating current values are saved in chronological order.

The determiner 333 is configured to determine whether the output current of the AC-DC converter 121 is larger than a predetermined current threshold for the output current of the AC-DC converter 121. The current-variation calculator 335 is configured to calculate a variation in the output current of the bidirectional DC-DC converter 131 per unit time in accordance with the pieces of information that each indicate a current value of the output current of the bidirectional DC-DC converter 131 and that are stored in the current-value storage 343. The difference calculator 336 is configured to calculate a difference obtained by subtracting the variation in the output current of the bidirectional DC-DC converter 131 per unit time from the upper limit of the variation in the output current of the bidirectional DC-DC converter 131 per unit time. The variation in the output current of the bidirectional DC-DC converter 131 per unit time is calculated by the current-variation calculator 335.

The voltage-variation identifier 337 is configured to identify a piece of information indicating the target-voltage variation corresponding to the range to which the difference calculated by the difference calculator 336 belongs. The piece of information is selected from multiple kinds of information that indicate target-voltage variations and that are stored in the voltage-variation storage 344. The target-voltage setter 334 is configured to determine a new second target voltage in accordance with a piece of information indicating the second target voltage and the voltage variation identified by the voltage-variation identifier 337. The piece of information indicating the second target voltage is stored in the target-voltage storage 341.

Upon acquiring a stop warning signal from the signal processor 14, the stop-warning-signal acquirer 339 sends to the PSU output-current acquirer 331 and the BM output-current acquirer 332 stop-warning-signal acquisition notification reporting the acquisition of a stop warning signal.

Figure 5:
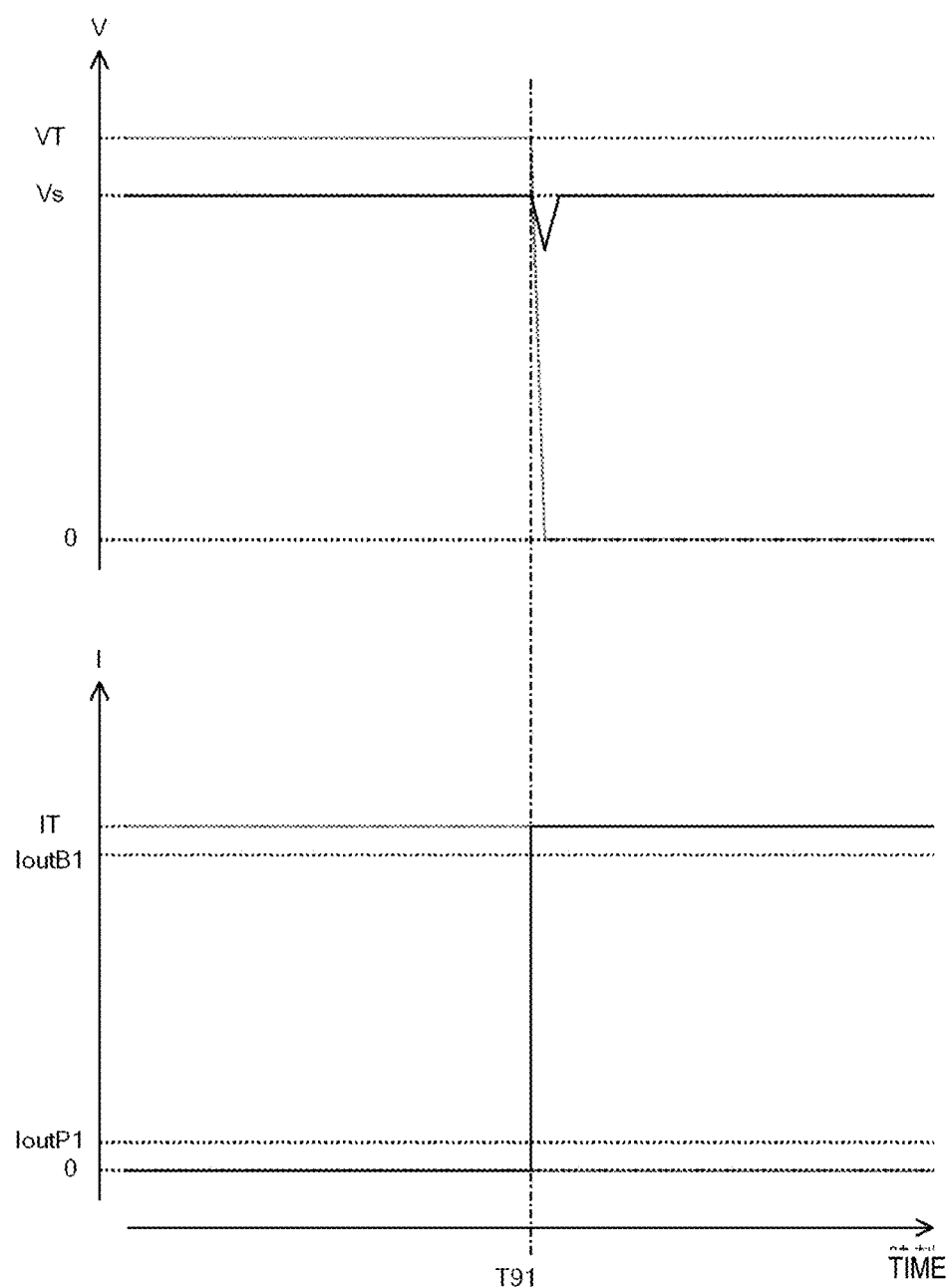
FIG. 5 illustrates characteristics of the output voltage and the output current of a power supply and a battery module according to a comparative example.

Next, description will be provided with respect to operation of the power supply system according to the present preferred embodiment in comparison with operation of a power supply system according to a comparative example. The power supply system according to the comparative example is the same or substantially the same as the power supply system according to the present preferred embodiment shown in FIG. 1 except that the power supply system according to the comparative example does not include the signal processor 14 and that battery modules 13 operate independently of power supplies 12. In the power supply system according to the comparative example, for example, as shown in FIG. 5, it is assumed that a controller 123 of a power supply 12 performs constant voltage control of an AC-DC converter 121 and causes the AC-DC converter 121 to output a first target voltage VT before a time T91. It is assumed that a controller 133 of a battery module 13 also performs constant voltage control of a bidirectional DC-DC converter 131 in the discharge mode and causes the bidirectional DC-DC converter 131 to output a second target voltage Vs at this time. The second target voltage Vs is set to a voltage lower than the first target voltage VT. In this case, a current having a current value IT is supplied from the power supply 12 to a load 101, and the current value of a current supplied from the battery module 13 to the load 101 is maintained at 0.

Then, when power supply from the alternating-current power source 100 is shut off, the output voltage of the AC-DC converter 121 rapidly decreases at the time T91, and the output current of the battery module 13 rapidly changes from 0 to IT. At this time, the constant voltage control of the battery module 13 is not able to follow the rapid variation in the output current. In this way, in the power supply system according to the comparative example, when the source of power supply to the load 101 switches from the power supplies 12 to the battery modules 13 because alternating-current power supply from the alternating-current power source 100 stops, an instantaneous drop in the voltage applied to the load 101 occurs.

Figure 6:
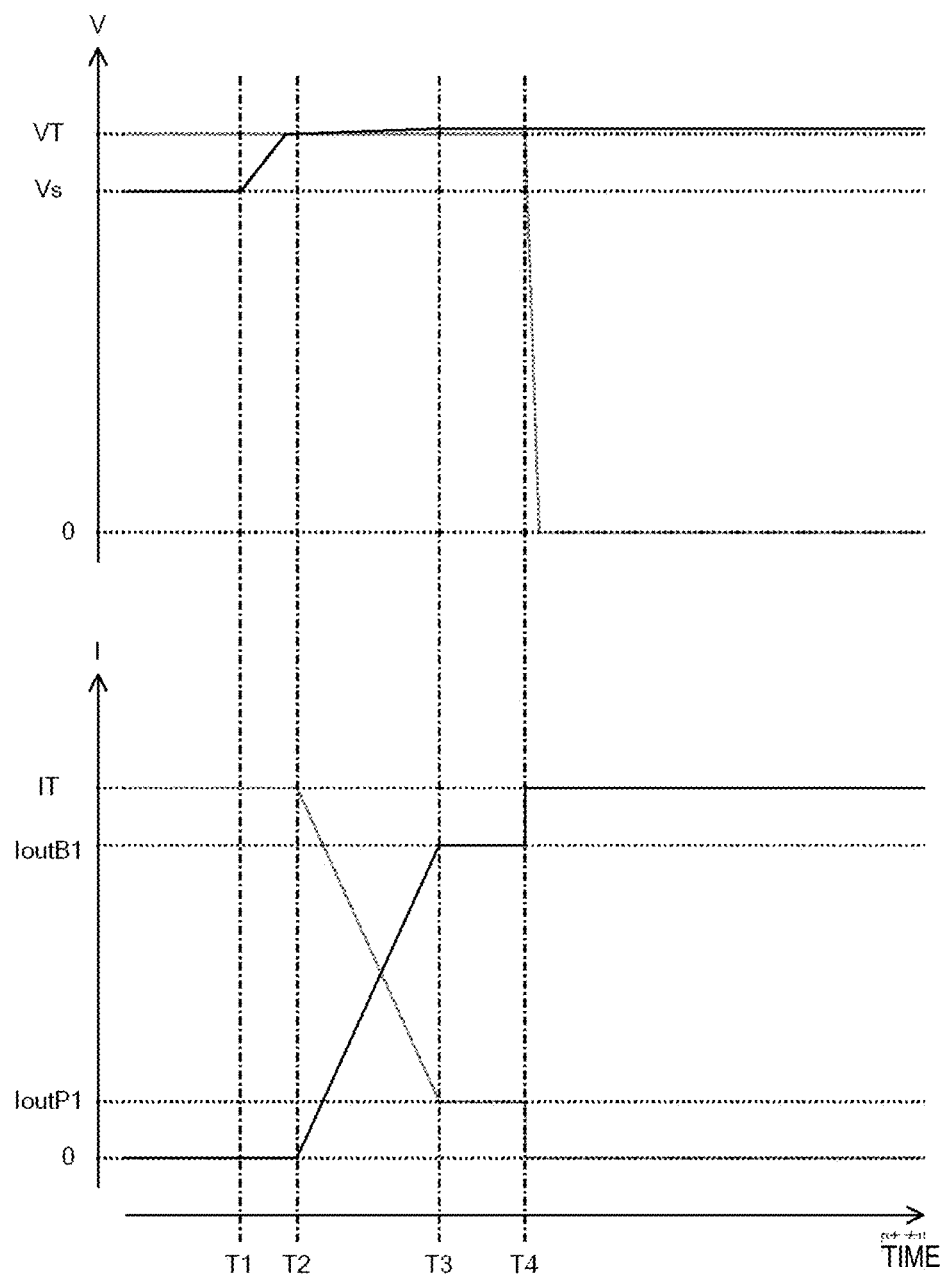
FIG. 6 illustrates characteristics of the output voltage and the output current of a power supply and a battery module according to the first preferred embodiment of the present invention.

In contrast, the power supply system according to the present preferred embodiment, for example, as shown in FIG. 6, in response to an input of the stop warning signal from the signal processor 14, the controller 133 gradually increases the second target voltage of the bidirectional DC-DC converter 131 from the voltage Vs to the voltage VT between a time T1 and a time T2 after the time T1. Then, the controller 133 further gradually increases the second target voltage of the bidirectional DC-DC converter 131 after the time T2. As shown in FIG. 6, the voltage variation (variation in the voltage per unit time) at the time T2 is smaller than voltage variations between the time T1 and the time T2. At this time, the output current of the AC-DC converter 121 of the power supply 12 gradually decreases as the output voltage of the bidirectional DC-DC converter 131 increases. Then, when the current value of the output current of the AC-DC converter 121 decreases to a reference current value IoutP1, which is predetermined and is smaller than a current value IoutB1, at a time T3 after the time T2, the controller 133 maintains the second target voltage of the bidirectional DC-DC converter 131 at a constant value. At that time, the current value of the output current of the bidirectional DC-DC converter 131 reaches the current value IoutB1, which is smaller than the current value IT.

Thereafter, when the output current and the output voltage of the power supply 12 becomes 0 at a time T4, the output current of the battery module 13 reaches IT. In short, in the power supply system according to the present preferred embodiment, before alternating-current power supply from the alternating-current power source 100 stops, the current value of the current supplied from the bidirectional DC-DC converter 131 of the battery module 13 to the load 101 is increased in advance to a current value close to the current value IT of the current to be supplied to the load 101. At that time, the current value of the current supplied from the power supply 12 to the load 101 decreases to the reference current value IoutP1, which is close to 0 and is predetermined. In this way, when the alternating-current power supply from the alternating-current power source 100 stops and the output of the AC-DC converter 121 of the power supply 12 stops, a rapid increase in the current supplied from the bidirectional DC-DC converter 131 of the battery module 13 to the load 101 is reduced. Consequently, when the source of power supply to the load 101 switches from the power supplies 12 to the battery modules 13, the voltage applied to the load 101 can be maintained at a constant value.

Figure 7:
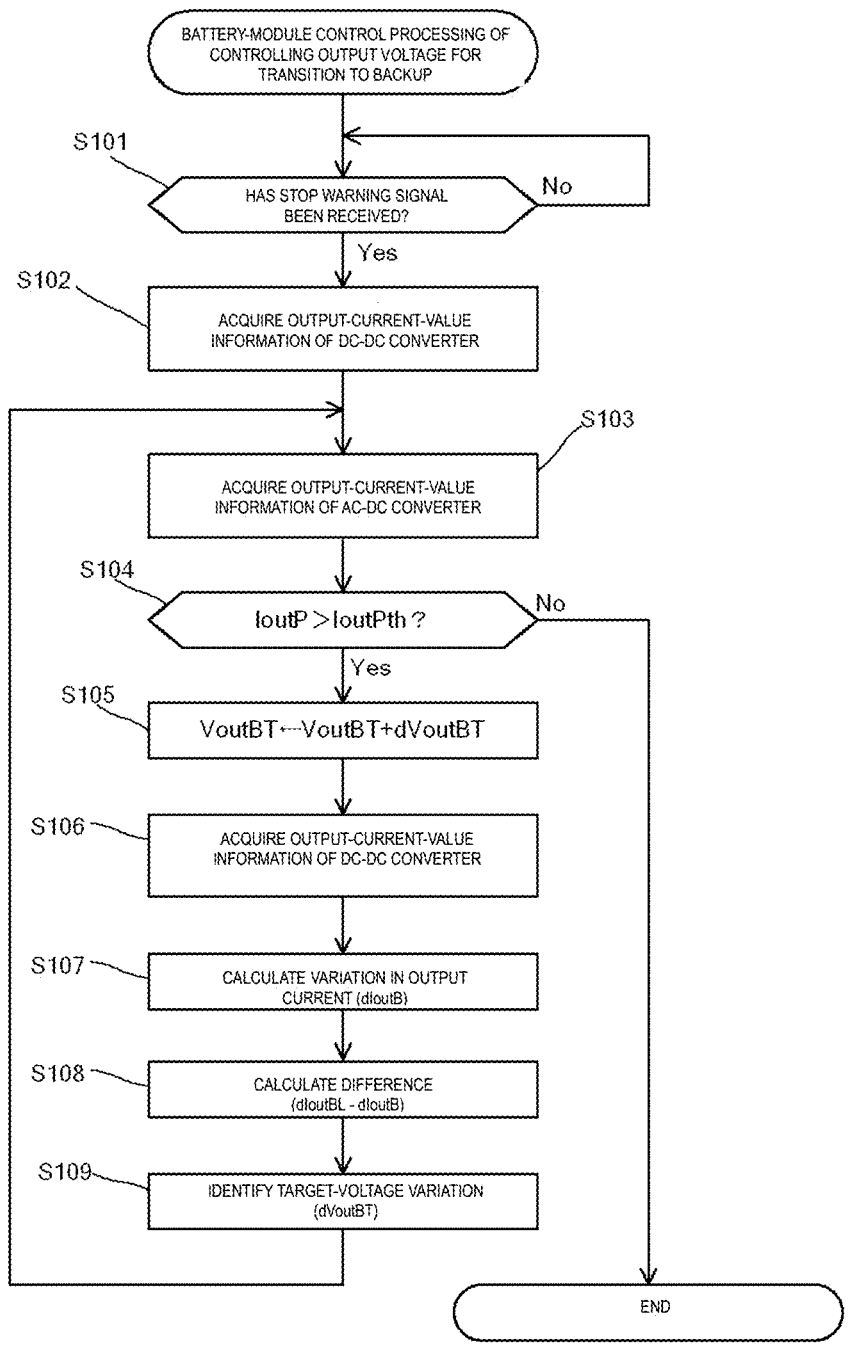
FIG. 7 is a flowchart showing an example flow of battery-module control processing performed by the controller according to the first preferred embodiment of the present invention.

Next, referring to FIG. 7, description will be provided with respect to battery-module control processing of controlling output voltage for transition to backup. The battery-module control processing is performed by the controller 133 according to the present preferred embodiment. The battery-module control processing is started in response to the battery module 13 being powered on. The initial value of the second target voltage is set to, for example, about 12.2 V. The initial value of the voltage variation in the second target voltage is set to, for example, about 0.01 V. First, the stop-warning-signal acquirer 339 determines whether a stop warning signal has been received from the signal processor 14 (step S101). If the stop warning signal has not been received from the signal processor 14 (No in step S101), the stop-warning-signal acquirer 339 repeats the process in step S101 until the stop warning signal is received. In contrast, if the stop-warning-signal acquirer 339 determines that the stop warning signal has been received from the signal processor 14 (Yes in step S101), the BM output-current acquirer 332 acquires output-current-value information indicating the magnitude of the output current of the bidirectional DC-DC converter 131 (step S102). Next, the PSU output-current acquirer 331 acquires output-current-value information indicating the magnitude of the output current of the AC-DC converter 121 of the power supply 12 (step S103). The output current of the AC-DC converter 121 corresponds to the current share signal, which is received from the signal processor 14.

Subsequently, the determiner 333 acquires from the reference-value storage unit 342 information indicating a current threshold for the output current of the AC-DC converter 121. Then, the determiner 333 determines whether an output current IoutP indicated by the output-current-value information of the AC-DC converter 121 is larger than a current threshold IoutPth (step S104). If the determiner 333 determines that the output current IoutP of the AC-DC converter 121 is equal to or smaller than the current threshold IoutPth (No in step S104), the battery-module control processing of controlling output voltage for transition to backup ends.

It is assumed herein that the determiner 333 determines that the output current IoutP of the AC-DC converter 121 is larger than the current threshold IoutPth (Yes in step S104). In this case, the target-voltage setter 334 acquires information that indicates a second target voltage VoutBT and that is stored in the target-voltage storage 341 and sets a new second target voltage to a voltage (VoutBT+dVoutBT), which is obtained by adding a voltage variation dVoutBT to the second target voltage VoutBT indicated by the acquired information (step S105). Here, the voltage variation dVoutBT is the initial value of the voltage variation or a voltage variation determined by the voltage-variation identifier 337.

Thereafter, the BM output-current acquirer 332 acquires output-current-value information indicating the magnitude of the output current of the bidirectional DC-DC converter 131 (step S106). Next, the current-variation calculator 335 acquires from the current-value storage 343 pieces of information indicating previous current values of the output current of the bidirectional DC-DC converter 131. Then, the current-variation calculator 335 calculates a variation dIoutB in the output current of the bidirectional DC-DC converter 131 (step S107).

Subsequently, the difference calculator 336 calculates a difference (dIoutBL−dIoutB) obtained by subtracting the calculated variation dIoutB in the output current of the bidirectional DC-DC converter 131 per unit time from the upper limit of the variation dIoutBL in the output current of the bidirectional DC-DC converter 131 per unit time (step S108). Thereafter, the voltage-variation identifier 337 identifies a piece of information indicating the target-voltage variation corresponding to the range to which the difference calculated by the difference calculator 336 belongs (step S109). The piece of information is selected from multiple kinds of information that indicate target-voltage variations and that are stored in the voltage-variation storage 344. Next, the process in step S103 is repeated. In this way, by performing a series of processes in step S103 to step S109, the controller 133 gradually increases the second target voltage so that the current variation, per unit time, in the current flowing from the bidirectional DC-DC converter 131 to the load 101, that is, the output current of the bidirectional DC-DC converter 131, is lower than the predetermined upper limit of the variation.

As described above, in the battery module 13 according to the present preferred embodiment, before the power supply 12 outputs the stop warning signal, the controller 133 performs control of the output voltage of the bidirectional DC-DC converter 131 such that the second target voltage is lower than the first target voltage. In addition, after the power supply 12 outputs the stop warning signal, the controller 133 performs control of the output voltage of the bidirectional DC-DC converter 131 such that the second target voltage becomes equal or substantially equal to the first target voltage or higher. In this way, when the source of power supply to the load 101 switches from the power supplies 12 to the battery modules 13, a rapid increase in the current supplied from the battery modules 13 to the load 101 can be reduced. Accordingly, a variation in the voltage applied to the load 101 is reduced. The variation in the voltage is caused because the constant voltage control of the battery module 13 is not able to follow the variation in the load current.

In addition, immediately after the power supply 12 outputs the stop warning signal described above, the controller 133 of the battery module 13 according to the present preferred embodiment starts to gradually increase the second target voltage, which has been set to a voltage lower than the first target voltage. In this way, the output voltage of the bidirectional DC-DC converter 131 of the battery module 13 can be smoothly increased.

Further, when the current value of the current flowing from the power supply 12 to the load 101, that is, the current value of the output current of the AC-DC converter 121, has become equal to or smaller than the predetermined reference current value, the controller 133 of the battery module 13 according to the present preferred embodiment maintains the second target voltage at a constant value. In this way, a malfunction of the load 101 caused by an excessive increase in the voltage applied to the load 101 is prevented from occurring because an excessive increase in the voltage supplied from the battery module 13 and applied to the load 101 is avoided.

In addition, when the second target voltage of the bidirectional DC-DC converter 131 has become equal to or higher than the first target voltage, which is described above, the controller 133 of the battery module 13 according to the present preferred embodiment maintains the second target voltage at a constant value. In this way, operation of the load 101 can be stabilized because the variation in the voltage supplied from the battery module 13 and applied to the load 101 can be reduced.

Further, the controller 133 of the battery module 13 according to the present preferred embodiment gradually increases the second target voltage so that the current variation in the output current of the bidirectional DC-DC converter 131 per unit time is smaller than the predetermined upper limit of the variation. In this way, the voltage applied to the load 101 can be stabilized because an instantaneous drop in the output voltage of the bidirectional DC-DC converter 131 is avoided.

Second Preferred Embodiment

Similarly to the battery module 13 according to the first preferred embodiment, a battery module according to a second preferred embodiment of the present invention includes a bidirectional DC-DC converter, a battery, and a controller. However, the battery module according to the present preferred embodiment differs from the battery module 13 according to the first preferred embodiment in that a current measurer configured to measure the output current of the bidirectional DC-DC converter is not included in the battery module.

Figure 8:
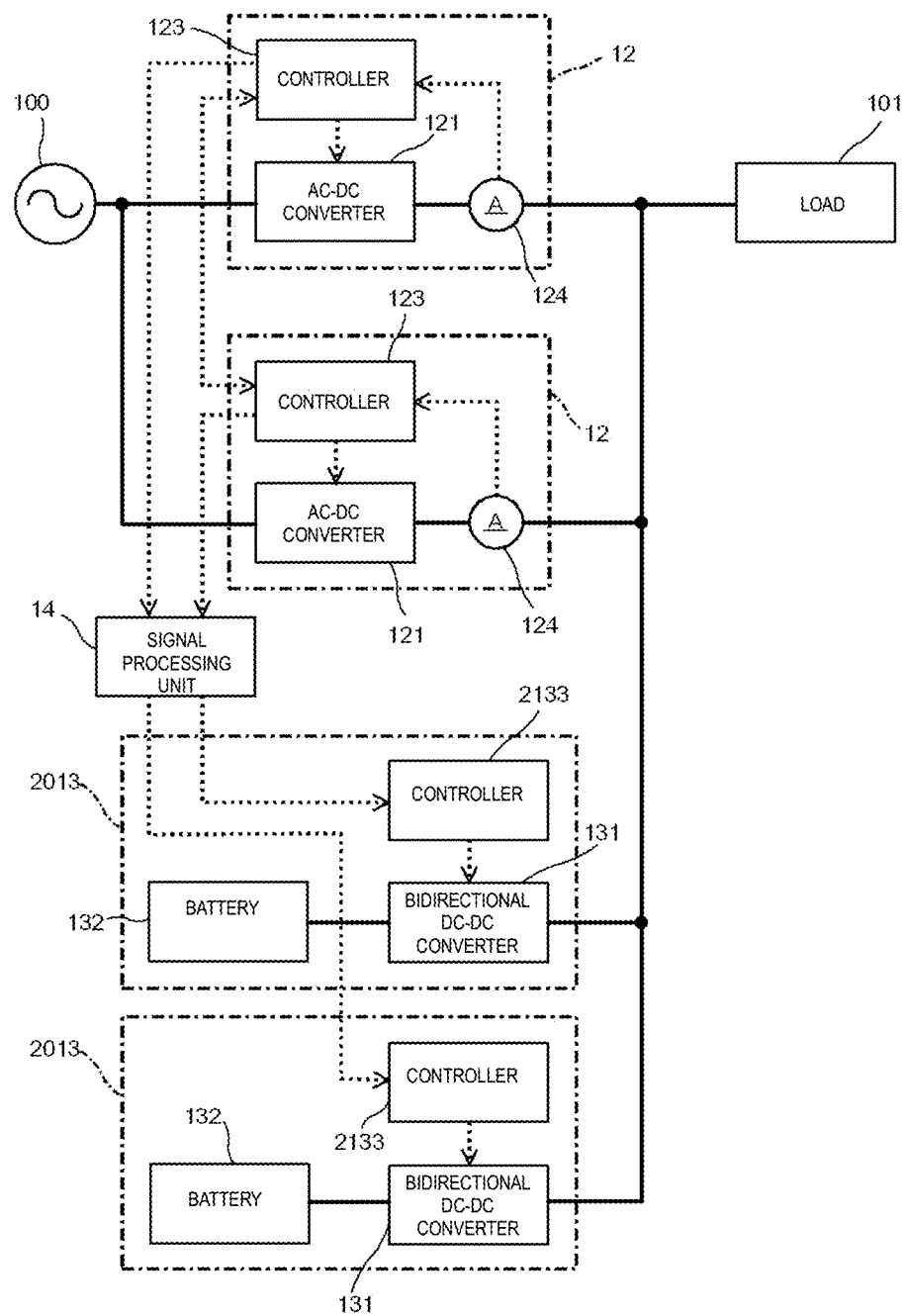
FIG. 8 is an illustration showing a schematic configuration of a power supply system according to a second preferred embodiment of the present invention.

For example, as shown in FIG. 8, a power supply system according to the present preferred embodiment includes two power supplies 12, two battery modules 2013 each including a battery 132, and a signal processor 14. In FIG. 8, components that are the same as or similar to those in the power supply system according to the first preferred embodiment are denoted by the same reference numerals as in FIG. 1. Each battery module 2013 includes a bidirectional DC-DC converter 131, the battery 132, a controller 2133 configured or programmed to control the bidirectional DC-DC converter 131.

Similarly to the controller 133 according to the first preferred embodiment, the controller 2133 includes, for example, an integrated circuit including an MPU and a memory and is configured or programmed to perform constant voltage control such that the output voltage of the bidirectional DC-DC converter 131 is maintained at a predetermined second target voltage. In addition, the controller 2133 is configured or programmed to change the second target voltage in accordance with a current share signal received from the signal processor 14. Further, before the controller 123 of the power supply 12 outputs the stop warning signal described above, the controller 2133 performs control of the output voltage of the bidirectional DC-DC converter 131 such that the second target voltage is lower than the first target voltage described above. In addition, after the controller 123 outputs the stop warning signal, the controller 2133 performs control of the output voltage of the DC-DC converter such that the second target voltage becomes equal to the first target voltage or higher.

Figure 9:
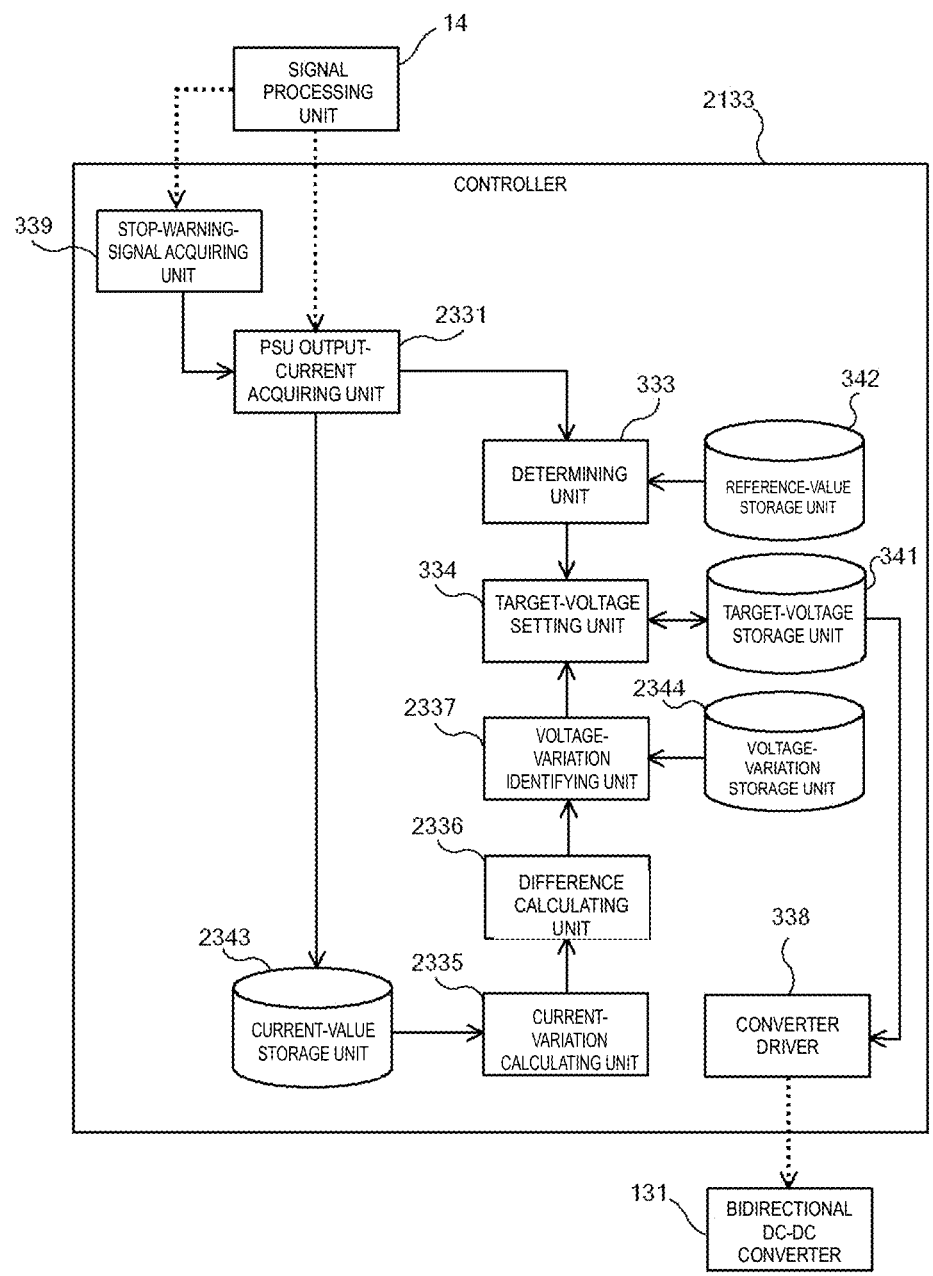
FIG. 9 is a block diagram of a controller according to the second preferred embodiment of the present invention.

As shown in FIG. 9, in the controller 2133, for example, the MPU is configured or programmed to execute a program stored in the memory and function as a PSU output-current acquirer 2331, a determiner 333, a target-voltage setter 334, a voltage-variation identifier 2337, a difference calculator 2336, a current-variation calculator 2335, and a stop-warning-signal acquirer 339. In FIG. 9, components that are the same as or similar to those in the first preferred embodiment are denoted by the same reference numerals as in FIG. 3. The memory includes a target-voltage storage 341, a reference-value storage 342, a current-value storage 2343, and a voltage-variation storage 2344. Further, the controller 2133 includes a converter driver 338 that is configured to drive the bidirectional DC-DC converter 131 by outputting a PWM signal to the bidirectional DC-DC converter 131. The current-value storage 2343 is configured to store pieces of information that each indicate a current value of the output current of the AC-DC converter 121 of the power supply 12 and that is acquired by the PSU output-current acquirer 2331. The pieces of information indicating current values are stored in chronological order.

For example, as shown in FIG. 10, the voltage-variation storage 2344 is configured to store pieces of information each indicating a target-voltage variation, which is a variation in the second target voltage, in association with ranges of a difference (dIoutPL−dIoutP). Here, dIoutP represents a variation in the output current of the AC-DC converter 121 of the power supply 12 per unit time, and dIoutPL represents the lower limit of dIoutP, which is predetermined. For example, dIoutPL is set to about −10 A/sec.

Referring to FIG. 9, the PSU output-current acquirer 2331 is configured to acquire a current value of the output current of the AC-DC converter 121. The output current corresponds to the current share signal, which is received from the signal processor 14. Then, the PSU output-current acquirer 2331 is configured to save in the current-value storage 2343 pieces of information that each indicate an acquired current value of the output current of the AC-DC converter 121. The pieces of information indicating current values are saved in chronological order. The current-variation calculator 2335 is configured to calculate a variation in the output current of the AC-DC converter 121 per unit time in accordance with the pieces of information that each indicate a current value of the output current of the AC-DC converter 121 and that are stored in the current-value storage 2343. The difference calculator 2336 is configured to calculate a difference obtained by subtracting the variation in the output current of the AC-DC converter 121 per unit time from the lower limit of the variation in the output current of the AC-DC converter 121 per unit time. The variation in the output current of the AC-DC converter 121 per unit time is calculated by the current-variation calculator 2335.

The voltage-variation identifier 2337 is configured to identify a piece of information indicating the target-voltage variation corresponding to the range to which the difference calculated by the difference calculator 2336 belongs. The piece of information is selected from multiple kinds of information that indicate target-voltage variations and that are stored in the voltage-variation storage 2344.

Figure 11:
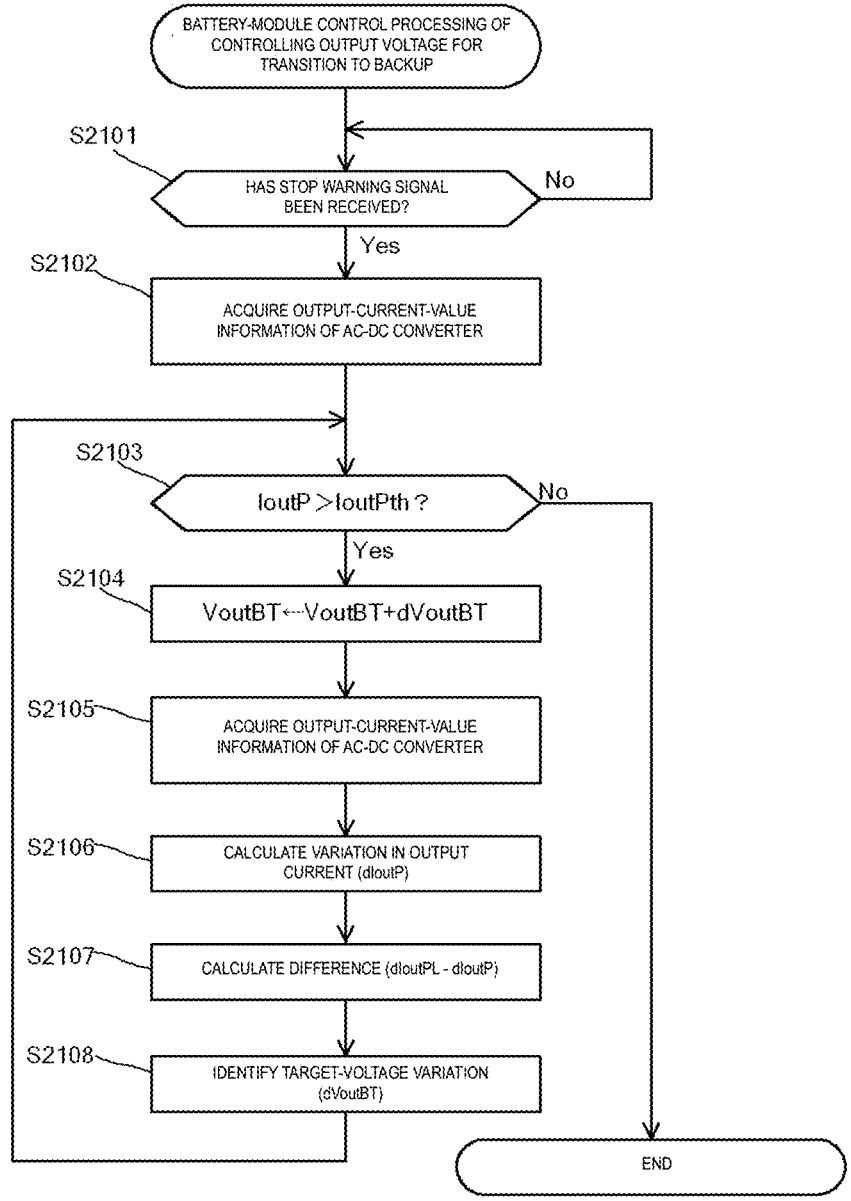
FIG. 11 is a flowchart showing an example flow of battery-module control processing performed by the controller according to the second preferred embodiment of the present invention.

Next, referring to FIG. 11, description will be provided with regard to battery-module control processing of controlling output voltage for transition to backup. The battery-module control processing is performed by the controller 2133 according to the present preferred embodiment. Here, similarly to the first preferred embodiment, the initial value of the second target voltage is set to, for example, about 12.2 V, and the initial value of the voltage variation in the second target voltage is set to, for example, about 0.01 V. First, the stop-warning-signal acquirer 339 determines whether a stop warning signal has been received from the signal processor

14 (step S2101). If the stop warning signal has not been received from the signal processor 14 (No in step S2101), the stop-warning-signal acquirer 339 repeats the process in step S2101 until the stop warning signal is received. It is assumed herein that the stop-warning-signal acquirer 339 determines that a stop warning signal has been received from the signal processor 14 (Yes in step S2101). In this case, the PSU output-current acquirer 2331 acquires output-current-value information indicating the magnitude of the output current of the AC-DC converter 121 of the power supply 12 (step S2102). The output current corresponds to the current share signal, which is received from the signal processor 14.

Next, the determiner 333 acquires from the reference-value storage unit 342 information indicating a current threshold for the output current of the AC-DC converter 121. Then, the determiner 333 determines whether an output current IoutP indicated by the output-current-value information of the AC-DC converter 121 is larger than a current threshold IoutPth (step S2103). If the determiner 333 determines that the output current IoutP of the AC-DC converter 121 is equal to or smaller than the current threshold IoutPth (No in step S2103), the battery-module control processing of controlling output voltage for transition to backup ends.

It is assumed herein that the determiner 333 determines that the output current IoutP of the AC-DC converter 121 is larger than the current threshold IoutPth (Yes in step S2103). In this case, the target-voltage setter 334 acquires information that indicates a second target voltage VoutBT and that is stored in the target-voltage storage 341 and sets a new second target voltage to a voltage (VoutBT+dVoutBT), which is obtained by adding a voltage variation dVoutBT to the second target voltage VoutBT indicated by the acquired information (step S2104). Here, the voltage variation dVoutBT is the initial value of the voltage variation or a voltage variation determined by the voltage-variation identifier 2337.

Subsequently, the PSU output-current acquirer 2331 acquires output-current-value information indicating the magnitude of the output current of the AC-DC converter 121 (step S2105). Thereafter, the current-variation calculator 2335 acquires from the current-value storage 2343 pieces of information indicating previous current values of the output current of the AC-DC converter 121. Then, the current-variation calculator 2335 calculates a variation dIoutP in the output current of the AC-DC converter 121 (step S2106).

Next, the difference calculator 2336 calculates a difference (dIoutPL−dIoutP) obtained by subtracting the calculated variation dIoutP in the output current of the AC-DC converter 121 per unit time from the lower limit of the variation dIoutPL in the output current of the AC-DC converter 121 per unit time (step S2107). Subsequently, the voltage-variation identifier 2337 identifies a piece of information indicating the target-voltage variation corresponding to the range to which the difference calculated by the difference calculator 2336 belongs (step S2108). The piece of information is selected from multiple kinds of information that indicate target-voltage variations and that are stored in the voltage-variation storage 2344. Thereafter, the process in step S2103 is repeated.

As described above, in the battery module 2013 according to the present preferred embodiment, the output voltage of the bidirectional DC-DC converter 131 is controlled without using information indicating the current value of the output current of the bidirectional DC-DC converter 131. In this way, since a current measurer configured to measure the output current of the bidirectional DC-DC converter 131 can be omitted, the configuration of the battery module 2013 can be simplified correspondingly.

The preferred embodiments of the present invention have been described as above, but the present invention is not limited to the configurations described in the above-described preferred embodiments. For example, when the battery module 13 gradually increases the output voltage of the bidirectional DC-DC converter 131 after acquiring the stop warning signal from the power supply 12, the second target voltage may be maintained at a constant value after the second target voltage exceeds a predetermined upper limit of the target voltage. In this case, the reference-value storage 342 is configured to store information indicating a voltage upper limit of the output voltage of the bidirectional DC-DC converter 131 together with the information indicating a predetermined current threshold for the output current of the AC-DC converter 121. The voltage upper limit is the upper limit of the output voltage of the bidirectional DC-DC converter 131 during operation in the discharge mode and is set based on the rated voltage for the load 101.

Figure 12:
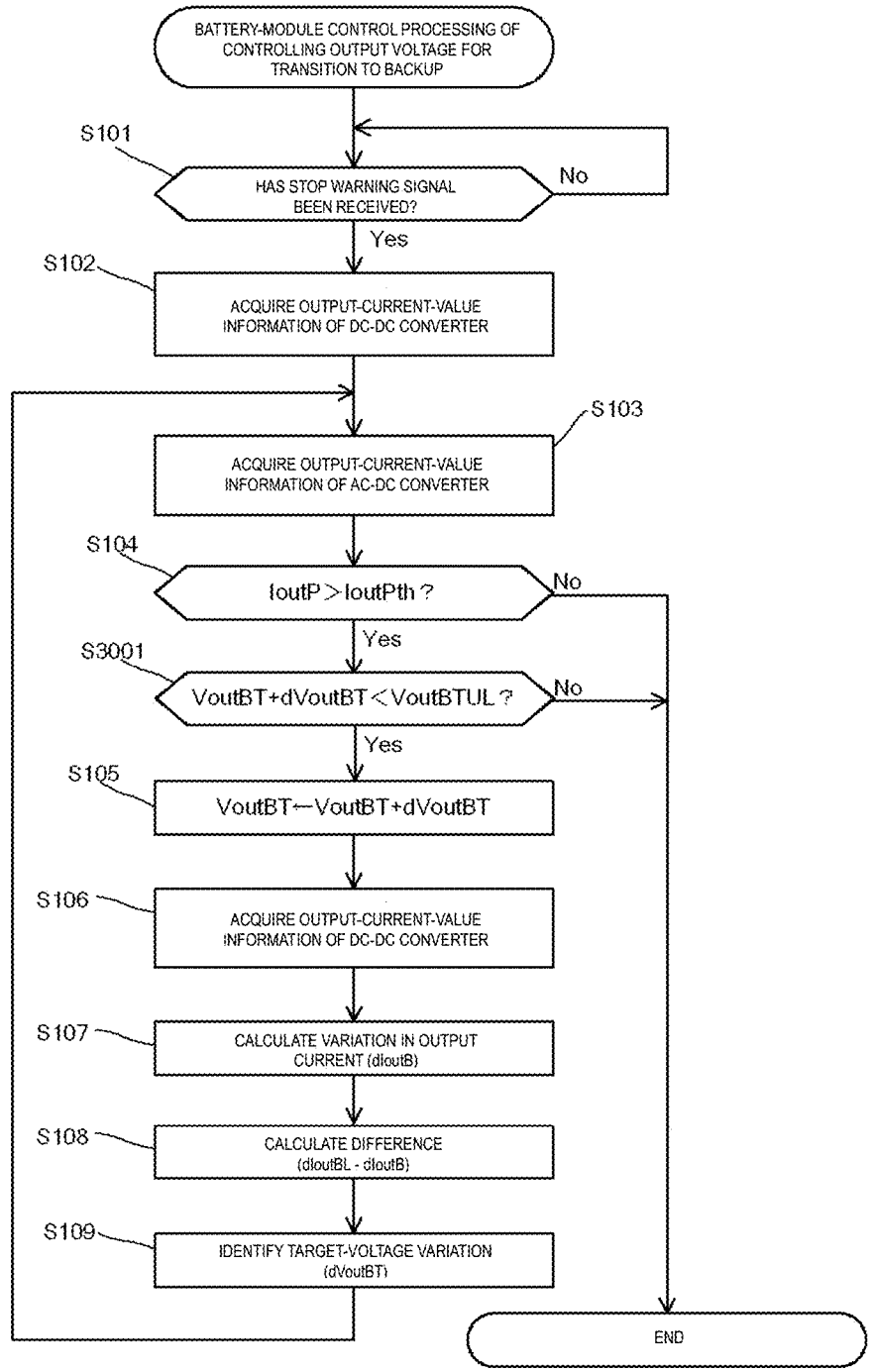
FIG. 12 is a flowchart showing an example flow of battery-module control processing performed by a controller according to a modification of a preferred embodiment of the present invention.

Referring to FIG. 12, description will be provided herein with respect to battery-module control processing of controlling output voltage for transition to backup, which is performed by the controller 133 according to a modification of a preferred embodiment of the present invention. In FIG. 12, processes that are the same as or similar to those in the first preferred embodiment are denoted by the same reference numerals as in FIG. 7. First, after the processes in steps S101 to S103 are performed, the determiner 333 acquires from the reference-value storage 342 information indicating a current threshold for the output current of the AC-DC converter 121. Then, the determiner 333 determines whether an output current IoutP indicated by the output-current-value information of the AC-DC converter 121 is larger than a current threshold IoutPth (step S104). It is assumed herein that the determiner 333 determines that the output current IoutP of the AC-DC converter 121 is larger than the current threshold IoutPth (Yes in step S104). In this case, the determiner 333 acquires from the reference-value storage unit 342 information indicating the voltage upper limit of the output voltage of the bidirectional DC-DC converter 131. In addition, the determiner 333 acquires information that indicates the second target voltage VoutBT and that is stored in the target-voltage storage 341 and calculates a voltage (VoutBT+dVoutBT), which is obtained by adding a voltage variation dVoutBT to the second target voltage VoutBT indicated by the acquired information. Then, the determiner 333 determines whether the calculated voltage (VoutBT+dVoutBT) is lower than the voltage upper limit VoutBTUL described above (step S3001). If it is determined that the voltage calculated by the determiner 333 (VoutBT+dVoutBT) is equal to or higher than the voltage upper limit described above (No in step S3001), the battery-module control processing of controlling output voltage for transition to backup ends. In contrast, if it is determined that the voltage calculated by the determiner unit 333 (VoutBT+dVoutBT) is lower than the voltage upper limit VoutBTUL described above (Yes in step S3001), a series of processes starting from step S105 are executed.

According to the present configuration, a malfunction of the load 101 caused by an excessively high voltage applied to the load 101 is prevented from occurring because an excessive increase that leads to the output voltage of the bidirectional DC-DC converter 131 exceeding the voltage upper limit described above can be avoided.

The battery module 13 in the first preferred embodiment may be configured to determine whether the power supply from the power supply 12 to the load 101 has stopped after the source of power supply to the load 101 switches from the power supply 12 to the battery module 13. Then, after the battery module 13 determines that the power supply from the power supply 12 to the load 101 has stopped, the voltage value of the second target voltage applied to the load 101 may be reset.

Figure 13:
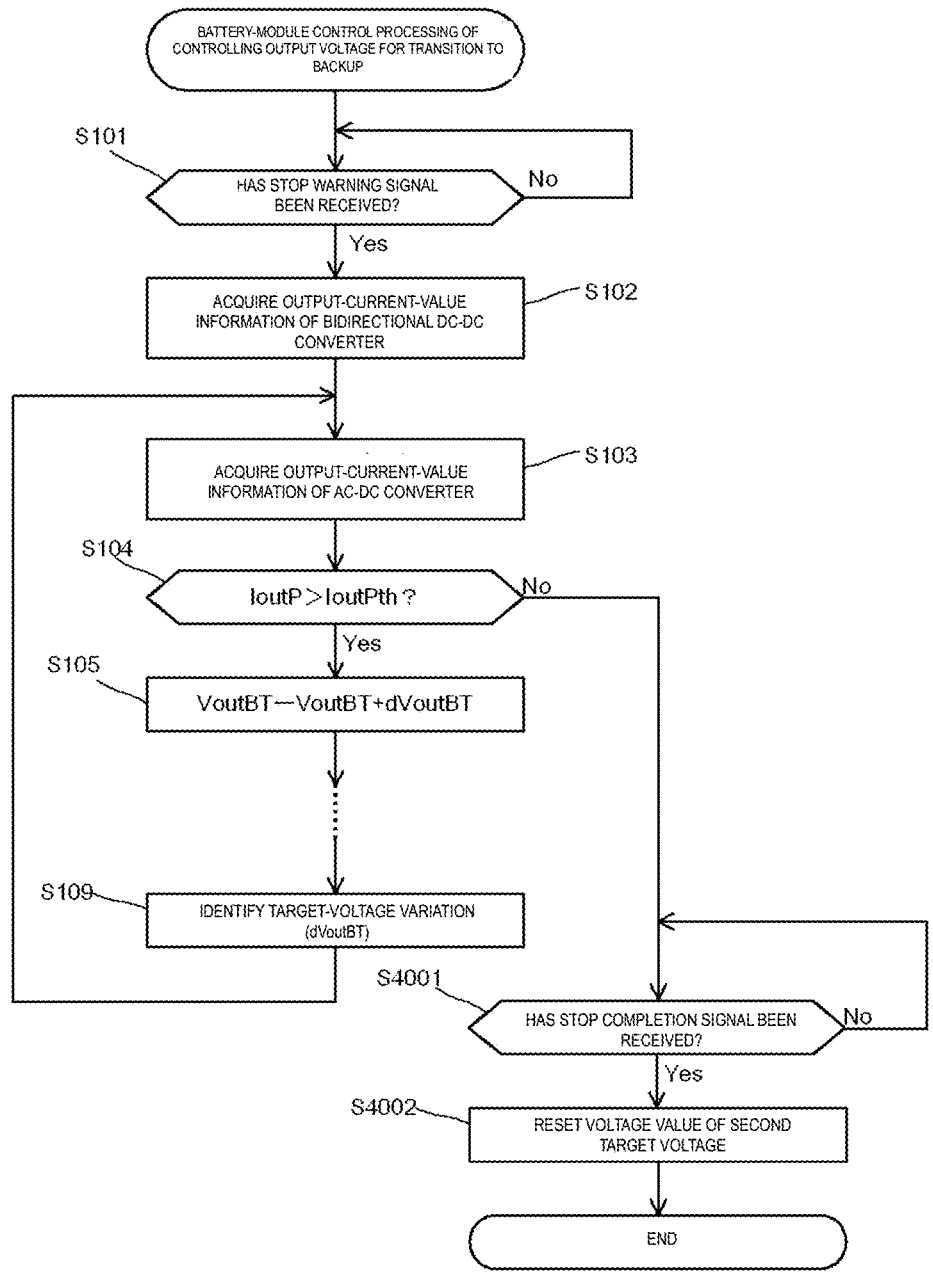
FIG. 13 is a flowchart showing an example flow of battery-module control processing performed by a controller according to a modification of a preferred embodiment of the present invention.

Referring to FIG. 13, description will be provided herein with respect to battery-module control processing of controlling output voltage for transition to backup, which is performed by the controller 133 according to the present modification. In FIG. 13, processes that are the same as or similar to those in the first preferred embodiment are denoted by the same reference numerals as in FIG. 7. First, after the processes in steps S101 to S103 are performed, the determiner 333 acquires from the reference-value storage unit 342 information indicating a current threshold for the output current of the AC-DC converter 121. Then, the determiner 333 determines whether an output current IoutP indicated by the output-current-value information of the AC-DC converter 121 is larger than a current threshold IoutPth (step S104). It is assumed herein that the determiner 333 determines that the output current IoutP of the AC-DC converter 121 is equal to or smaller than the current threshold IoutPth (No in step S104). In this case, the determiner 333 determines whether a stop completion signal for reporting that the AC-DC converter 121 has stopped operating has been received from the signal processor 14 (step S4001). When the output of the AC-DC converter 121 has stopped, the controller 123 outputs the stop completion signal to the signal processor 14. Upon receiving the stop completion signal, the signal processor 14 outputs the stop completion signal to the controller 133. If the determiner 333 determines that the stop completion signal has not been received from the signal processor 14 (No in step S4001), the process in step S4001 is repeatedly performed. In contrast, if the determiner 333 determines that the stop completion signal has been received from the signal processor 14 (Yes in step S4001), the target-voltage setter 334 resets the voltage value of the second target voltage to a voltage equal to the first target voltage in this case (step S4002). Next, battery-module control processing of controlling output voltage for transition to backup ends.

In the present modification, description has been provided with respect to a case where the controller 133 of the battery module 13 according to the first preferred embodiment performs the processes in steps S4001 and S4002 by way of illustration and not by way of limitation. For example, in the battery module 2013 according to the second preferred embodiment, after performing the processes in steps S2101 to S2103 in FIG. 11, the controller 2133 may perform the processes in steps S4001 and S4002 upon determining that the output current IoutP indicated by the output-current-value information of the AC-DC converter 121 is equal to or smaller than the current threshold IoutPth (No in step S2103).

According to this configuration, the battery module 13 resets the second target voltage to a voltage equal or substantially equal to the first target voltage after the power supply 12 stops operating. In this way, before and after the source of power supply to the load 101 switches from the power supplies 12 to the battery modules 13, the voltage applied to the load 101 can be maintained at a constant value.

The controller 133 of the battery module 13 in the first preferred embodiment may be configured to perform control such that a voltage variation in the output voltage of the bidirectional DC-DC converter 131 at a time when the output voltage of the bidirectional DC-DC converter 131 reaches the first target voltage is smaller than the maximum voltage variation during a period when the output voltage of the DC-DC converter 131 is increased to a voltage close to the first target voltage after the stop warning signal is received. Here, the voltage close to the first target voltage equals a voltage equal to or higher than about 95% and lower than about 100% of the first target voltage.

Figure 14:
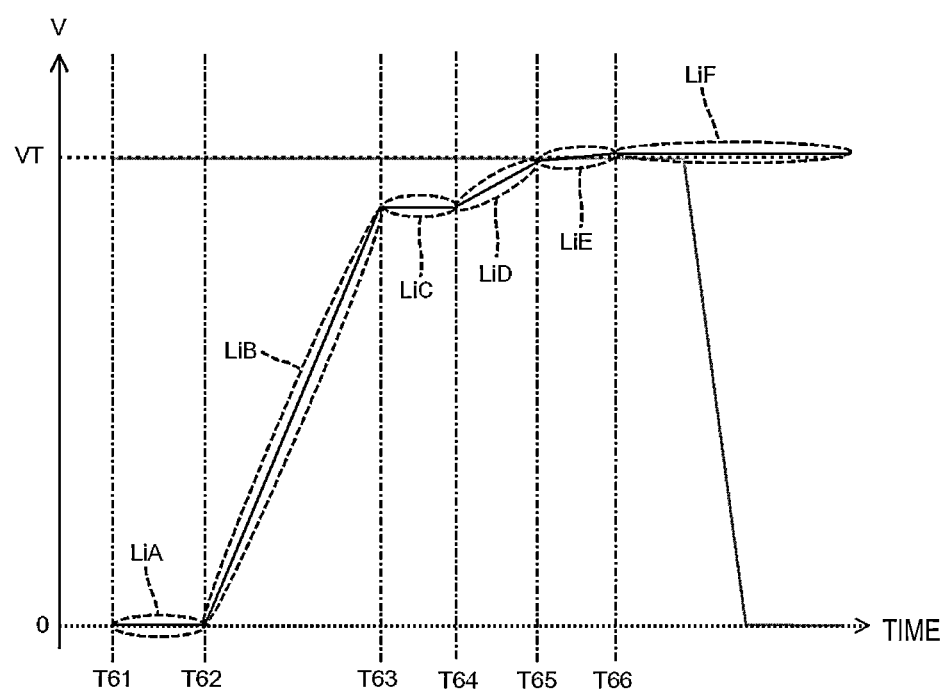
FIG. 14 illustrates characteristics of the output voltage of a power supply and a battery module according to a modification of a preferred embodiment of the present invention.

For example, as shown in FIG. 14, the controller 133 according to the present modification is configured to vary with time the voltage variation in the output voltage of the bidirectional DC-DC converter 131 (variation in the voltage per unit time) after receiving the stop warning signal. Immediately after receiving the stop warning signal at a time T61 (refer to LiA in FIG. 14), the controller 133 maintains the output voltage of the bidirectional DC-DC converter 131 with a voltage variation A (=about 0). Next, the controller 133 starts to increase the output voltage of the bidirectional DC-DC converter 131 with a voltage variation B at a time T62 after the time T61 (refer to LiB in FIG. 14). Then, the controller 133 starts to maintain the output voltage of the bidirectional DC-DC converter 131 with a voltage variation C (=about 0) at a time T63 after the time T62 (refer to LiC in FIG. 14). Subsequently, the controller 133 starts to increase the output voltage of the bidirectional DC-DC converter 131 with a voltage variation D at a time T64 after the time T63 (refer to LiD in FIG. 14) and starts to increase the output voltage of the bidirectional DC-DC converter 131 with a voltage variation E at a time T65 after the time T64 (refer to LiE in FIG. 14). Then, the controller 133 starts to increase the output voltage of the bidirectional DC-DC converter 131 with a voltage variation F when the output voltage of the bidirectional DC-DC converter 131 exceeds the voltage VT at a time T65 after the time T64 (refer to LiF in FIG. 14). For the voltage variations A, B, C, D, E, and F, a relationship B>D>E>F>A=C holds. The voltage variations A and C are both about 0. In this way, the controller 133 sets the voltage variation (voltage variation F) at the time when the output voltage of the bidirectional DC-DC converter 131 reaches the voltage VT such that the voltage variation is smaller than the maximum voltage variation B during the period when the output voltage of the bidirectional DC-DC converter 131 is increased so as to be close to the voltage VT after the stop warning signal is received.

According to the present configuration, it is possible to cause the output voltage of the bidirectional DC-DC converter 131 to reach the target voltage in a relatively short period and cause the current value of the current supplied from the battery module 13 to the load 101 to gradually increase. Consequently, when the source of power supply to the load 101 switches from the power supplies 12 to the battery modules 13, the variation in the voltage applied to the load 101 can be reduced.

In each preferred embodiment, description has been provided with respect to a configuration including two power supplies 12 by way of illustration and not by way of limitation. For example, a configuration including only one power supply 12 and a configuration including three or more power supplies 12 are also possible. In each preferred embodiment, description has been provided with respect to a configuration including two battery modules 13 by way of illustration and not by way of limitation. For example, a configuration including only one battery module 13 and a configuration including three or more battery modules 13 are also possible.

In each preferred embodiment, description has been provided with respect to a configuration including the signal processor 14 by way of illustration and not by way of limitation. For example, a configuration in which the current share signal, the stop warning signal, or both of these signals, which are output from the controller 123 of the power supply 12, are directly input to the controller 133 of the battery module 13 is also possible.

Figure 15:
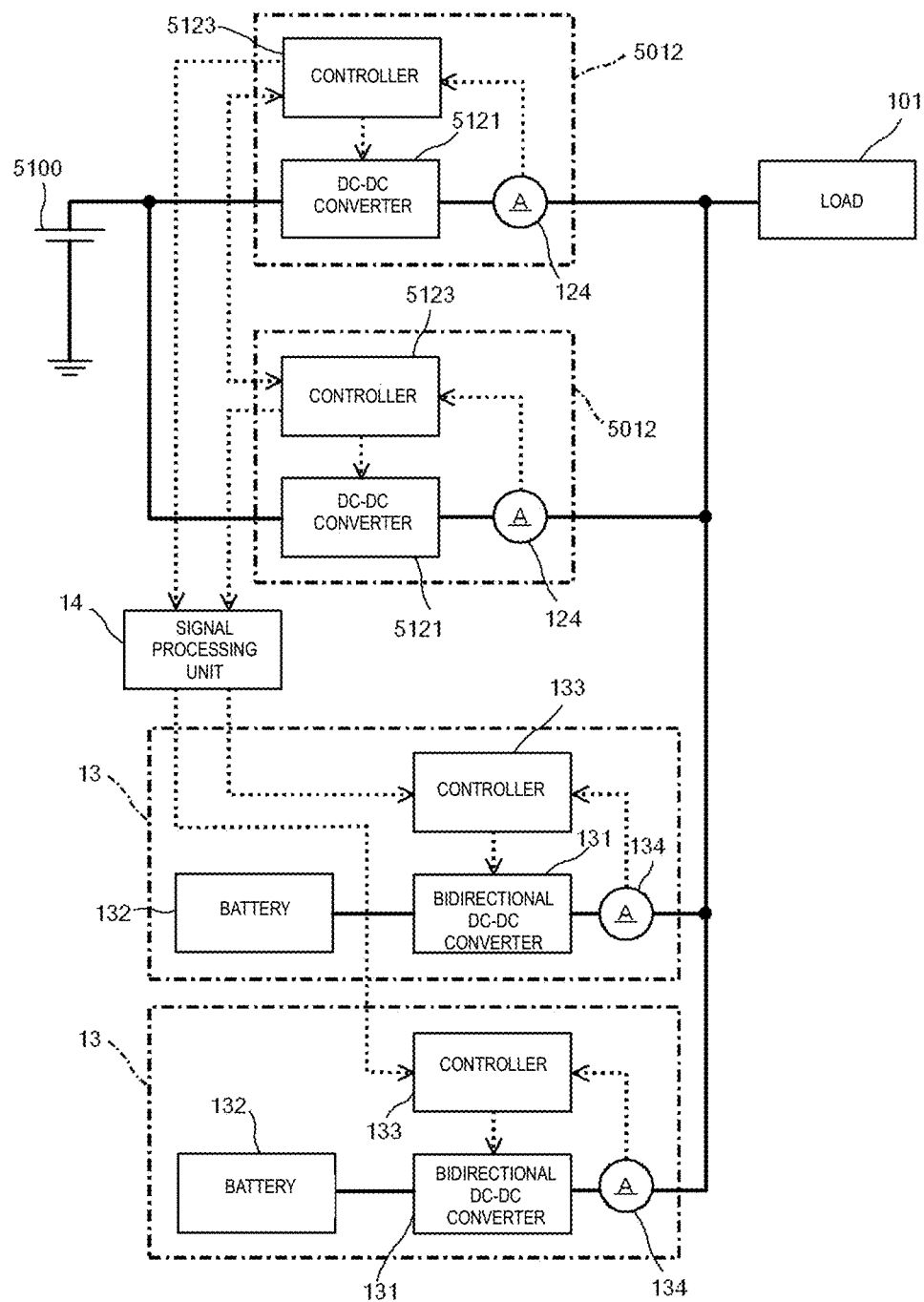
FIG. 15 is an illustration showing a schematic configuration of a power supply system according to a modification of a preferred embodiment of the present invention.

In each preferred embodiment, description has been provided with respect to an example where each power supply 12 includes the AC-DC converter 121, which is configured to convert alternating-current power supplied from the alternating-current power source 100 into direct-current power. However, this example is not limiting. For example, as shown in FIG. 15, a power supply 5012 may include a DC-DC converter 5121, which is configured to convert direct-current power supplied from a direct-current power source 5100 into direct-current power having a different voltage. In FIG. 15, components that are the same as or similar to those in the first preferred embodiment are denoted by the same reference numerals as in FIG. 1. In this case, the power supply 5012 includes a controller 5123 configured or programmed to control the DC-DC converter 5121 and a current measurer 124 configured to measure a current value of a current that is output from the DC-DC converter 5121. Examples of the direct-current power source 5100 include a direct-current voltage bus connected to a power generation facility by using a PV converter.

The DC-DC converter 5121 corresponds to a first DC-DC converter including a boost circuit, a buck circuit, or a buck-boost circuit. The controller 5123 corresponds to a first controller configured or programmed to perform constant voltage control of the DC-DC converter 5121 such that a voltage that is output from the DC-DC converter 5121 to the load 101 equals or substantially equals a predetermined target voltage. In addition, the controller 5123 is configured or programmed to output a stop warning signal to the signal processor 14. Before the voltage output to the load 101 is stopped, the stop warning signal provides advance notice that the voltage output to the load 101 is to stop. Similarly to the first preferred embodiment, a power supply system according to the present modification includes battery modules 13 each including a battery 132, a bidirectional DC-DC converter 131, and a controller 133. The bidirectional DC-DC converter 131 corresponds to a second DC-DC converter configured to convert a direct-current voltage that is output from the battery 132 and thereafter output the direct-current voltage to the load 101. Further, the controller 133 corresponds to a second controller configured or programmed to, before receiving the stop warning signal, perform control such that the output voltage of the DC-DC converter 131 is lower than the target voltage and, after receiving the stop warning signal and before the output of the power supply 5012 stops, increase the output voltage of the bidirectional DC-DC converter 131 to the target voltage or higher.

Preferred embodiments and modifications according to the present invention have been described above, but the present invention is not limited to these preferred embodiments and modifications. The present invention includes appropriate combinations of the preferred embodiments and the modifications and also includes modifications to such combinations.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery module to be connected to a power supply configured to output a predetermined target voltage to a load, the battery module comprising:
   a battery;
   a DC-DC converter to convert a direct-current voltage that is output from the battery and thereafter output the direct-current voltage to the load; and
   a controller configured or programmed to perform constant voltage control of the DC-DC converter and receive a stop warning signal providing advance notice that output of the power supply is to stop; wherein
   the controller is configured or programmed to, before receiving the stop warning signal, perform control such that an output voltage of the DC-DC converter is lower than the target voltage and, after receiving the stop warning signal and before the output of the power supply stops, increase the output voltage of the DC-DC converter to the target voltage or higher.

2. The battery module according to claim 1, wherein the controller is configured or programmed to perform control such that a voltage variation in the output voltage of the DC-DC converter at a time when the output voltage of the DC-DC converter reaches the target voltage is smaller than a maximum voltage variation during a period when the output voltage of the DC-DC converter is increased to a voltage close to the target voltage after the stop warning signal is received.

3. The battery module according to claim 2, wherein the controller is configured or programmed to perform control such that the output voltage of the DC-DC converter is maintained at a constant value when a current value of a current flowing from the power supply to the load has become equal to or smaller than a predetermined reference current value.

4. The battery module according to claim 1, wherein the controller is configured or programmed to perform control such that the output voltage of the DC-DC converter is maintained at a constant value when the output voltage of the DC-DC converter has become equal to or higher than the target voltage.

5. The battery module according to claim 1, wherein the controller is configured or programmed to gradually increase the output voltage of the DC-DC converter such that a variation in a current flowing from the DC-DC converter to the load per unit time is smaller than a predetermined upper limit of the variation.

6. The battery module according to claim 1, wherein the controller is configured or programmed to perform control such that the output voltage of the DC-DC converter is maintained at a constant value and thereafter perform control such that the output voltage of the DC-DC converter equals a voltage equal to the target voltage.

7. The battery module according to claim 1, wherein a voltage upper limit of the output voltage of the DC-DC converter is set based on a rated voltage for the load.

8. A power supply system comprising:
   a power supply including an AC-DC converter and a first controller, the AC-DC converter being configured to convert alternating-current power supplied from an alternating-current power source into direct-current power and output the direct-current power to a load, the first controller being configured or programmed to perform constant voltage control of the AC-DC converter such that a voltage that is output from the AC-DC converter to the load equals or substantially equals a predetermined target voltage, the first controller being configured or programmed to, before stopping voltage output to the load, output a stop warning signal providing advance notice that the voltage output to the load is to stop;

a battery;

a DC-DC converter to convert a direct-current voltage that is output from the battery and thereafter output the direct-current voltage to the load; and a second controller configured or programmed to perform constant voltage control of the DC-DC converter and receive the stop warning signal providing advance notice that output of the power supply is to stop; wherein the second controller is configured or programmed to, before receiving the stop warning signal, perform control such that an output voltage of the DC-DC converter is lower than the target voltage and, after receiving the stop warning signal and before the output of the power supply stops, increase the output voltage of the DC-DC converter to the target voltage or higher.

9. A power supply system comprising:

a power supply including a first DC-DC converter and a first controller, the first DC-DC converter being configured to convert direct-current power supplied from a direct-current power source into direct-current power having a different voltage and output the direct-current power having the different voltage to a load, the first controller being configured or programmed to perform constant voltage control of the first DC-DC converter such that a voltage that is output from the first DC-DC converter to the load equals or substantially equals a predetermined target voltage, the first controller being configured or programmed to, before stopping voltage output to the load, output a stop warning signal providing advance notice that the voltage output to the load is to stop;

a battery;

a second DC-DC converter to convert a direct-current voltage that is output from the battery and thereafter output the direct-current voltage to the load; and a second controller configured or programmed to perform constant voltage control of the second DC-DC converter and receive the stop warning signal providing advance notice that output of the power supply is to stop; wherein the second controller is configured or programmed to, before receiving the stop warning signal, perform control such that an output voltage of the second DC-DC converter is lower than the target voltage and, after receiving the stop warning signal and before the output of the power supply stops, increase the output voltage of the second DC-DC converter to the target voltage or higher.

10. The power supply system according to claim 8, wherein the second controller is configured or programmed to perform control such that a voltage variation in the output voltage of the DC-DC converter at a time when the output voltage of the DC-DC converter reaches the target voltage is smaller than a maximum voltage variation during a period when the output voltage of the DC-DC converter is increased to a voltage close to the target voltage after the stop warning signal is received.

11. The power supply system according to claim 10, wherein the second controller is configured or programmed to perform control such that the output voltage of the DC-DC converter is maintained at a constant value when a current value of a current flowing from the power supply to the load has become equal to or smaller than a predetermined reference current value.

12. The power supply system according to claim 8, wherein the second controller is configured or programmed to perform control such that the output voltage of the DC-DC converter is maintained at a constant value when the output voltage of the DC-DC converter has become equal to or higher than the target voltage.

13. The power supply system according to claim 8, wherein the second controller is configured or programmed to gradually increase the output voltage of the DC-DC converter such that a variation in a current flowing from the DC-DC converter to the load per unit time is smaller than a predetermined upper limit of the variation.

14. The power supply system according to claim 8, wherein the second controller is configured or programmed to perform control such that the output voltage of the DC-DC converter is maintained at a constant value and thereafter perform control such that the output voltage of the DC-DC converter equals a voltage equal to the target voltage.

15. The power supply system according to claim 8, wherein a voltage upper limit of the output voltage of the DC-DC converter is set based on a rated voltage for the load.

16. The power supply system according to claim 9, wherein the second controller is configured or programmed to perform control such that a voltage variation in the output voltage of the second DC-DC converter at a time when the output voltage of the second DC-DC converter reaches the target voltage is smaller than a maximum voltage variation during a period when the output voltage of the second DC-DC converter is increased to a voltage close to the target voltage after the stop warning signal is received.

17. The power supply system according to claim 16, wherein the second controller is configured or programmed to perform control such that the output voltage of the second DC-DC converter is maintained at a constant value when a current value of a current flowing from the power supply to the load has become equal to or smaller than a predetermined reference current value.

18. The power supply system according to claim 9, wherein the second controller is configured or programmed to perform control such that the output voltage of the second DC-DC converter is maintained at a constant value when the output voltage of the second DC-DC converter has become equal to or higher than the target voltage.

19. The power supply system according to claim 9, wherein the second controller is configured or programmed to gradually increase the output voltage of the second DC-DC converter such that a variation in a current flowing from the second DC-DC converter to the load per unit time is smaller than a predetermined upper limit of the variation.

20. The power supply system according to claim 9, wherein the second controller is configured or programmed to perform control such that the output voltage of the second DC-DC converter is maintained at a constant value and thereafter perform control such that the output voltage of the DC-DC converter equals a voltage equal to the target voltage.

* * * * *